(12) United States Patent
Lam et al.

(10) Patent No.: US 10,107,975 B1
(45) Date of Patent: Oct. 23, 2018

(54) OPTOELECTRONIC ASSEMBLY FOR OPTICAL COUPLING

(71) Applicant: Denselight Semiconductors Pte. Ltd., Singapore (SG)

(72) Inventors: Yee Loy Lam, Singapore (SG); Long Cheng Koh, Singapore (SG); Kian Hin Victor Teo, Singapore (SG)

(73) Assignee: Denselight Semiconductors Pte. Ltd., Singapore (SG)

( * ) Notice: Subject to any disclaimer, the term of this patent is extended or adjusted under 35 U.S.C. 154(b) by 0 days.

(21) Appl. No.: 15/810,491

(22) Filed: Nov. 13, 2017

(51) Int. Cl.
*G02B 6/42* (2006.01)
*G02B 6/32* (2006.01)

(52) U.S. Cl.
CPC ............. *G02B 6/4204* (2013.01); *G02B 6/32* (2013.01); *G02B 6/423* (2013.01); *G02B 6/4225* (2013.01); *G02B 6/4238* (2013.01); *G02B 6/4249* (2013.01)

(58) Field of Classification Search
None
See application file for complete search history.

(56) References Cited

U.S. PATENT DOCUMENTS

| | | | |
|---|---|---|---|
| 4,749,250 A | 6/1988 | Carter | |
| 5,074,682 A | 12/1991 | Uno et al. | |
| 5,113,404 A | 5/1992 | Gaebe et al. | |
| 5,611,006 A | 3/1997 | Tabuchi | |
| 6,545,958 B1 * | 4/2003 | Hirai | G11B 7/094 369/44.32 |
| 7,006,411 B2 * | 2/2006 | Hirai | G11B 7/1369 369/44.24 |
| 7,359,294 B2 * | 4/2008 | Tukker | G11B 7/0956 369/112.26 |
| 7,668,421 B2 * | 2/2010 | Nagai | G02B 6/4206 359/641 |
| 7,830,473 B2 * | 11/2010 | Furuya | G02B 6/4204 349/61 |
| 7,991,254 B2 * | 8/2011 | Gollier | G02B 6/4226 359/239 |
| 2016/0025298 A1 * | 1/2016 | Reitterer | G02B 3/0087 362/231 |
| 2016/0377874 A1 * | 12/2016 | Zhou | G02B 27/0927 359/569 |

FOREIGN PATENT DOCUMENTS

| | | |
|---|---|---|
| DE | 10248769 B3 | 7/2004 |
| EP | 0691555 B1 | 3/1999 |

* cited by examiner

*Primary Examiner* — Tina Wong
(74) *Attorney, Agent, or Firm* — Goldberg Segalla LLP

(57) ABSTRACT

A method for manufacturing an optoelectronic assembly includes attaching an optical die, a first lens, a second lens, and an optical fiber to a sub-mount. The sub-mount includes a plurality of passive alignment features which aid in the passive alignment of the optical die, the first lens, and the optical fiber for attachment. The second lens is actively aligned between the first lens and the optical fiber, based on a coupling efficiency with which an optical signal emitted by the optical die is coupled into the optical fiber through the first and second lenses. The active alignment of the second lens includes calibration of at least one of a position and a degree of tilt of the second lens.

20 Claims, 8 Drawing Sheets

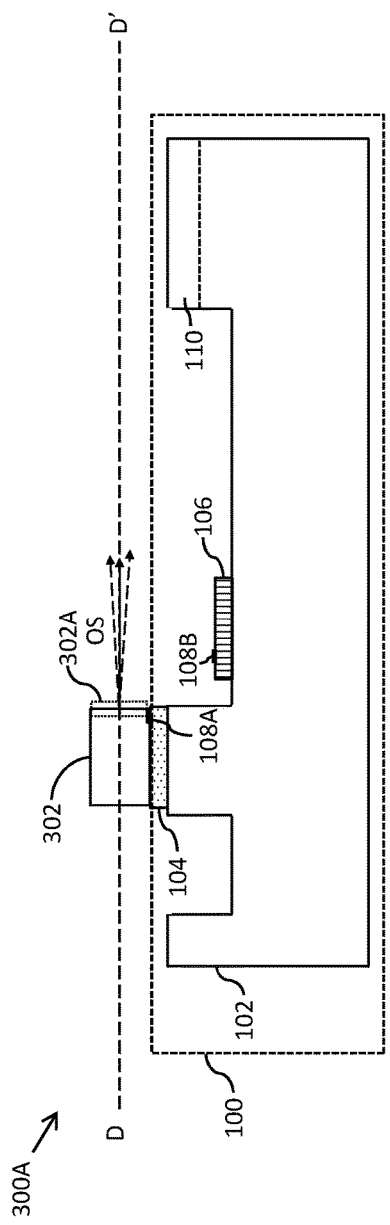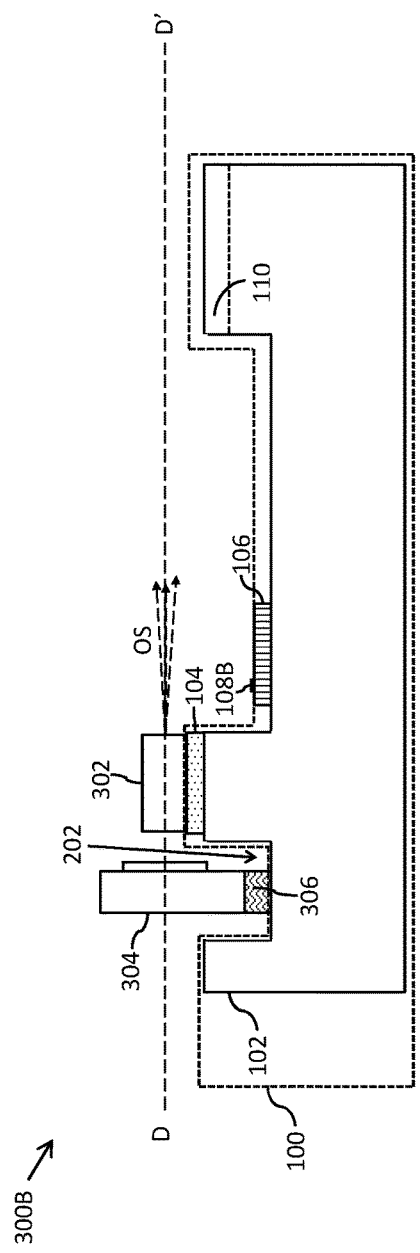

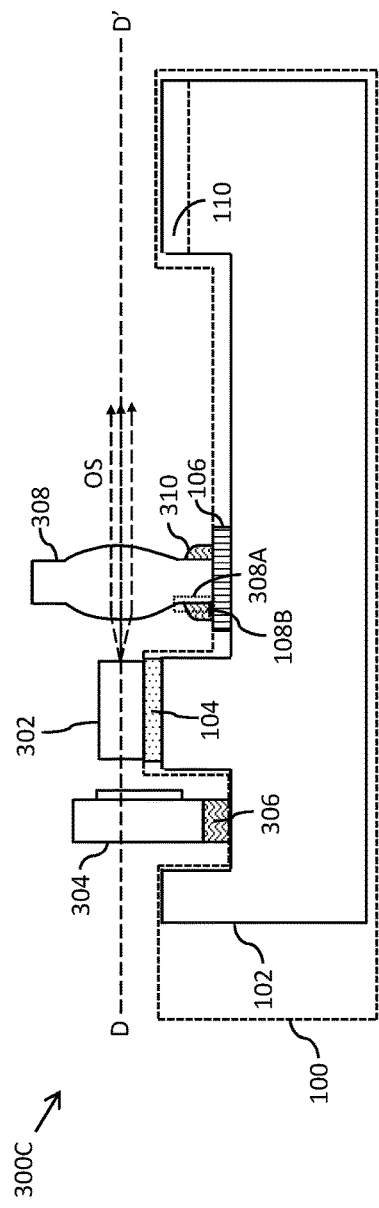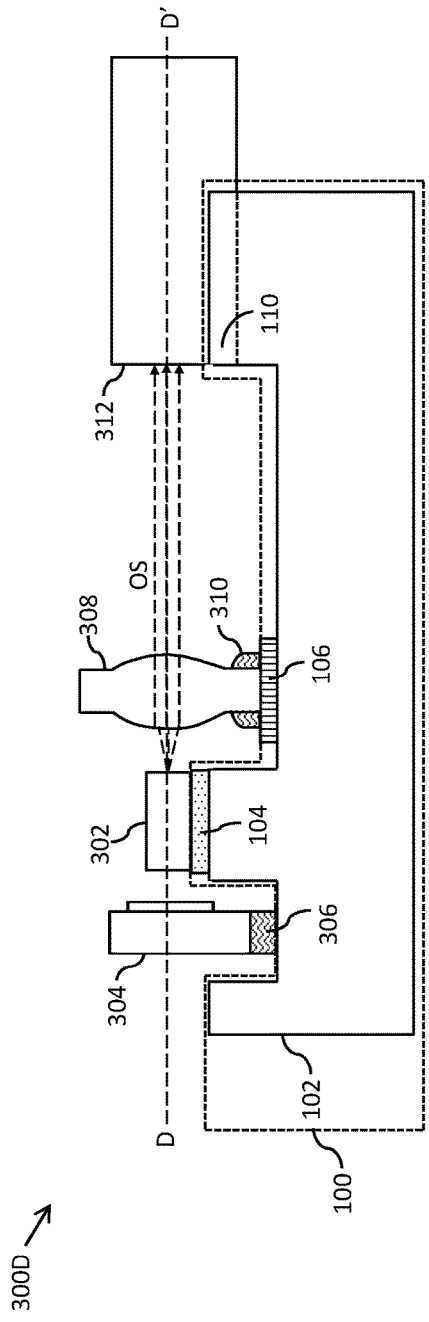
FIG. 3C
FIG. 3D

OPTOELECTRONIC ASSEMBLY FOR OPTICAL COUPLING

FIELD OF THE INVENTION

The present invention relates to optoelectronic communication systems, and more particularly to a method for manufacturing an optoelectronic assembly for optical coupling.

BACKGROUND

With proliferation of fiber-optic communication, a variety of optoelectronic assemblies have been developed for transmitting and receiving optical signals. Typically, an optoelectronic assembly includes an active device, such as a diode-laser, and an optical fiber. The active device emits the optical signal, which is coupled into the optical fiber for long distance communication. Generally, the active device and the optical fiber have different spot sizes for emitting the optical signal and receiving the optical signal, respectively. Since the spot size is inversely related to numerical aperture, the active device and the optical fiber further have different numerical apertures. This mismatch in the numerical apertures of the active device and the optical fiber, results in low coupling efficiency between the active device and the optical fiber, and further leads to coupling loss of the optical signal into the optical fiber. Thus, the optoelectronic assemblies incorporate various coupling mechanisms for improving the coupling efficiency, and thereby reducing the coupling losses.

A conventional optoelectronic assembly that uses a coupling mechanism is realized by a lensed optical fiber. In such an optoelectronic assembly, the active device is attached on an aluminum nitride sub-mount assembly and the lensed optical fiber is placed on a metalized heat sink sub-mount. The lensed optical fiber includes a lens at an input face of the optical fiber, which couples the optical signal from the active device into the optical fiber, thereby reducing the coupling loss. Such lensed fibers are usually manufactured individually, and thus suffer from process variations, which is undesirable. Further, for placing the lensed fiber on the heat sink sub-mount a high precision alignment, typically in the range of 10 µm, is required. Such a high precision alignment requirement leads to an increase in the cost and time of manufacturing the optoelectronic assembly. In addition, the use of two different sub-mounts for the active device and the lensed optical fiber makes the optoelectronic assembly bulky.

Another conventional optoelectronic assembly that uses a coupling mechanism is realized by way of a two-lens system, where the first lens serves as a collimating means and the second lens serves as a focusing means. Such a coupling mechanism includes active alignment of the first and second lenses for attaining a desired collimation and focusing output. Although the coupling mechanism realized by using the two-lens system offers high coupling efficiency and does not require high precision alignment, the use of two active alignment processes makes the coupling mechanism time consuming and complex. Typically, it takes 25-30 minutes to implement one active alignment process. As the two-lens system implements two active alignment processes, the time required for manufacturing the optoelectronic assembly is significantly increased, which is disadvantageous.

In light of the foregoing, there exists a need for an optoelectronic assembly that has high coupling efficiency, requires less precision alignment, and is less bulky. Further, it would be advantageous to have an optoelectronic assembly that does not require two active alignment processes.

SUMMARY

In an embodiment of the present invention, an optoelectronic assembly is provided. The optoelectronic assembly includes a sub-mount, an optical die, first and second lenses, and an optical fiber. The sub-mount includes a plurality of passive alignment features, such as first through third passive alignment features. The optical die that has a die alignment feature is attached to the sub-mount by aligning the die alignment feature with the first passive alignment feature. The optical die emits an optical signal. The first lens that has a lens alignment feature is attached to the sub-mount by aligning the lens alignment feature with the second passive alignment feature. The aligning of the lens alignment feature with the second passive alignment feature aligns the first lens with the optical die. The optical fiber is placed on the sub-mount by way of the third passive alignment feature and receives the optical signal through the first lens. The second lens has a first degree of tilt with respect to a propagation axis of the optical signal and is attached to the sub-mount at a first position between the first lens and the optical fiber. The first degree of tilt and the first position are determined by monitoring a coupling efficiency with which the optical signal is coupled into the optical fiber through the first and second lenses.

In another embodiment of the present invention, a method for manufacturing an optoelectronic assembly is provided. The method includes attaching an optical die having a die alignment feature to a sub-mount having a plurality of passive alignment features. The plurality of passive alignment features include first through third passive alignment features. The optical die is attached to the sub-mount by aligning the die alignment feature with the first passive alignment feature. The optical die emits an optical signal. Further, a first lens having a lens alignment feature is attached to the sub-mount by aligning the lens alignment feature with the second passive alignment feature. The aligning of the lens alignment feature with the second passive alignment feature aligns the first lens with the optical die. An optical fiber is placed on the sub-mount by way of the third passive alignment feature. The optical fiber receives the optical signal through the first lens. A first degree of tilt with respect to a propagation axis of the optical signal is determined for a second lens. Further, a first position between the first lens and the optical fiber is determined for attaching the second lens on the sub-mount. The first degree of tilt and the first position are determined based on a coupling efficiency with which the optical signal is coupled into the optical fiber through the first and second lenses. The second lens, having the first degree of tilt, is attached to the sub-mount at the first position.

In yet another embodiment of the present invention, an optoelectronic assembly manufactured by the method as described in the foregoing is provided.

Various embodiments of the present invention provide an optoelectronic assembly and a method for manufacturing the same. The method for manufacturing the optoelectronic assembly includes fabrication of a sub-mount by performing one or more wafer processing operations, such as patterned deposition, etching, lithography, and the like, on a substrate. The sub-mount includes a metal layer and a thin-film dielectric layer formed on the substrate. The sub-mount further includes a plurality of passive alignment features for passive alignment of various optical components. In one example, two of three passive alignment features are fiducial marks; such as a cross, or micro-machined mating features; such as stand-off, stop-blocks, and the like, and a third passive alignment feature is a v-groove that is formed on the substrate by etching the substrate.

An optical die having a die alignment feature is then placed on the sub-mount by aligning the die alignment feature with a first passive alignment feature. The optical die is permanently attached to the sub-mount by way of soldering. The optical die emits an optical signal. A first lens having a lens alignment feature is then placed on the sub-mount by aligning the lens alignment feature with a second passive alignment feature. The alignment between the lens alignment feature with the second passive alignment feature further aligns the first lens with the optical die. The optical signal emitted by the optical die becomes incident upon the first lens and the first lens then collimates the optical signal, thereby making the optical signal parallel to the surface of the substrate. An optical fiber is then placed in the v-groove of the sub-mount for receiving the optical signal.

A second lens is then actively aligned on the sub-mount between the first lens and the optical fiber. For performing the active alignment of the second lens, the second lens having an initial degree of tilt is placed at an initial position on the sub-mount. The initial position is between the first lens and the optical fiber. The second lens focusses the optical signal that is collimated by the first lens on to the optical fiber. A calibration device then monitors the coupling efficiency with which the optical signal is coupled into the optical fiber. When the coupling efficiency is less than a coupling efficiency threshold, at least one of the degree of tilt and the position of the second lens is calibrated. The process of monitoring the coupling efficiency, and the calibration of the degree of tilt and the position of the second lens is repeated until the coupling efficiency exceeds the coupling efficiency threshold. The degree of tilt and the position at which the coupling efficiency exceeds the coupling efficiency threshold refer to a final degree of tilt and a final position. The second lens having the final degree of tilt is then attached to the sub-mount at the final position between the first lens and the optical fiber to obtain the optoelectronic assembly.

Since the optical die, the first lens, and the optical fiber are passively aligned on the sub-mount by way of the first through third passive alignment features, the optoelectronic assembly does not require high precision alignment for attaching the optical die, the first lens, and the optical fiber. The optoelectronic assembly uses an active alignment process for aligning the second lens, thereby ensuring high coupling efficiency, i.e., greater than 50%. Since the optoelectronic assembly requires a single active alignment process for coupling the optical signal to the optical fiber, the time required for manufacturing the optoelectronic assembly is significantly reduced. Further, the optoelectronic assembly is implemented on a single substrate, and thus has small size in contrast to the conventional optoelectronic assemblies.

BRIEF DESCRIPTION OF THE DRAWINGS

The accompanying drawings illustrate various embodiments of systems, methods, and other aspects of the invention. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Various embodiments of the present invention are illustrated by way of example, and not limited by the appended figures, in which like references indicate similar elements, and in which:

FIGS. 3A-3F are cross-sectional views that illustrate the steps of an optoelectronic assembly manufacturing method, in accordance with an embodiment of the present invention;

Further areas of applicability of the present invention will become apparent from the detailed description provided hereinafter. It should be understood that the detailed description of exemplary embodiments is intended for illustration purposes only and is, therefore, not intended to necessarily limit the scope of the present invention.

DETAILED DESCRIPTION

The present invention is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

A "substrate" as used herein and throughout this disclosure refers to, but is not limited to, a surface upon which optical structures, such as laser diodes, lenses, optical fibers, and embodiments of the invention may be mounted. This may include, but not be limited to, InP, GaAs, silicon, silica-on-silicon, silica, silica-on-polymer, glass, a metal, a ceramic, a polymer, or a combination thereof.

A "metal" as used herein and throughout this disclosure refers to, but is not limited to, a material (element, compound, and alloy) that has good electrical and thermal conductivity as a result of readily losing outer shell electrons. This may include, but not be limited to, gold, chromium, aluminum, silver, platinum, nickel, copper, rhodium, palladium, tungsten, and combinations of such materials.

References to "an embodiment", "another embodiment", "yet another embodiment", "one example", "another example", "yet another example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Figure 1:
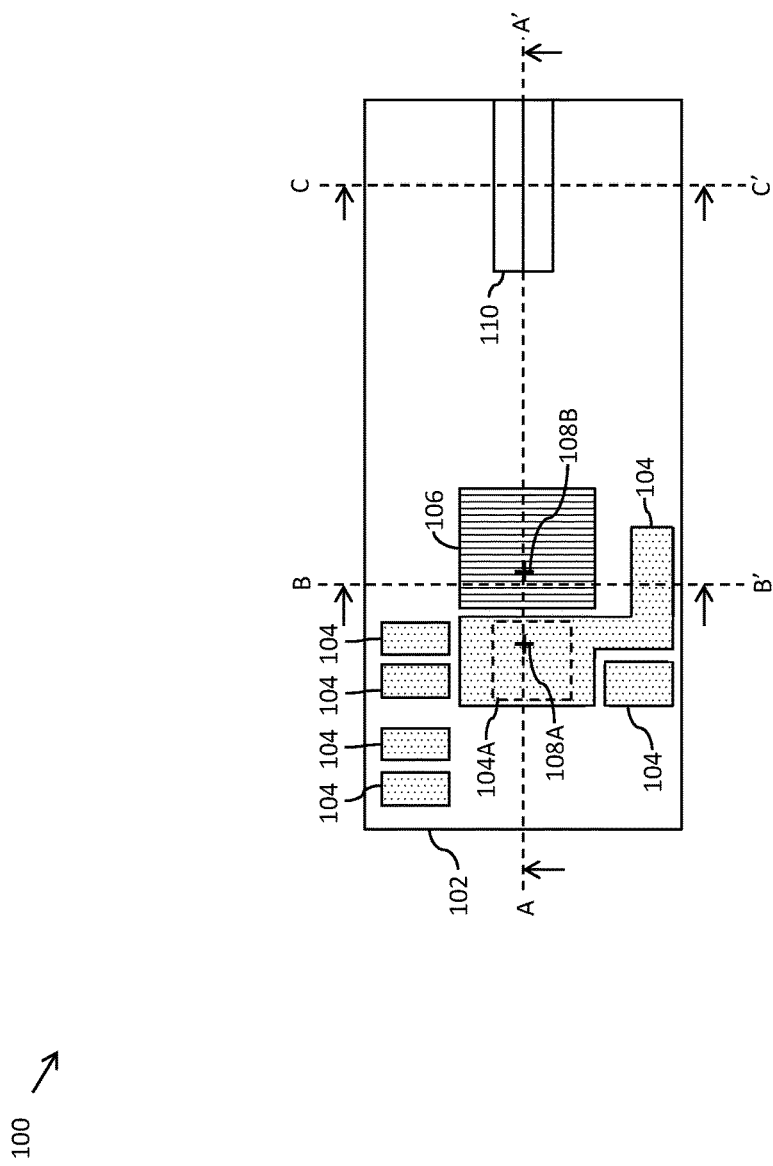
FIG. 1 is a top view of a sub-mount, in accordance with an embodiment of the present invention.

Referring now to FIG. 1, a top-view of a sub-mount 100, in accordance with an embodiment of the present invention, is shown. The sub-mount 100 is fabricated by performing one or more wafer processing operations, such as patterned deposition, etching, lithography, and the like, on a substrate 102. The substrate 102 is a silicon optical bench. The sub-mount 100 further includes a metal layer 104 and a dielectric layer 106 formed on the substrate 102 by way of patterned deposition and photolithography, respectively. Examples of the materials used for forming the metal layer 104 include, but are not be limited to, gold, chromium, aluminum, silver, platinum, nickel, copper, rhodium, palladium, tungsten, and combinations of such materials. The dielectric layer 106 is a thin-film dielectric layer. An example of the material used for forming the dielectric layer 106 includes a photosensitive polyimide dielectric material.

The sub-mount 100 further includes first through third passive alignment features 108A, 108B, and 110. The first passive alignment feature 108A is formed on a first portion 104A of the metal layer 104 by way of patterned deposition. The first portion 104A represents a die-placement site for the sub-mount 100. The second passive alignment feature 108B is formed on the dielectric layer 106 by way of photolithography. The third passive alignment feature 110 is formed on the substrate 102 by way of etching. The first and second alignment features 108A and 108B are fiducial marks, such as cross, which are formed on the first portion 104A and the dielectric layer 106, respectively. The third passive alignment feature 110 is a physical feature that is formed on the substrate 102 by etching. For example, the third passive alignment feature 110 is a v-groove 110. It will be apparent to a person having ordinary skill in the art that the third passive alignment feature 110 can also be a cavity, a dent, a guiding hole, and the like, without departing from the spirit of the invention. In an embodiment, when various optical components are attached to the sub-mount 100 by way of the first through third passive alignment features 108A, 108B, and 110, optical spots of the optical components are aligned within a tolerance range of 0.1 µm with respect to each other.

Figure 2A:
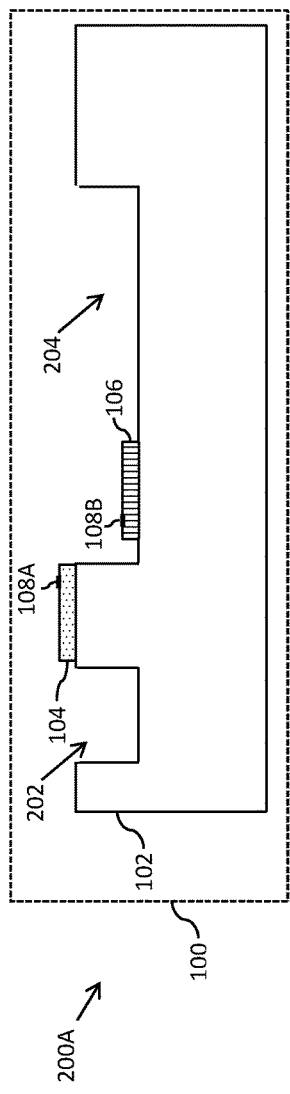
FIG. 2A is a first cross-sectional view of the sub-mount of FIG. 1, in accordance with an embodiment of the present invention.

Referring now to FIG. 2A, a first cross-sectional view 200A of the sub-mount 100 of FIG. 1, in accordance with an embodiment of the present invention, is shown. The first cross-sectional view 200A illustrates the sub-mount 100 along AA' axis (as shown in FIG. 1). The sub-mount 100 further includes first and second depressions 202 and 204 that are formed by etching the substrate 102. The dielectric layer 106 is formed on a portion of the substrate 102 that is exposed in the second depression 204 by way of patterned photolithography.

Figure 2B:
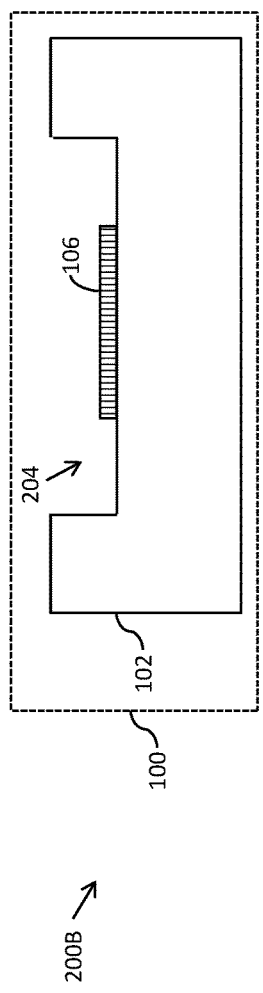
FIG. 2B is a second cross-sectional view of the sub-mount of FIG. 1, in accordance with an embodiment of the present invention.

Referring now to FIG. 2B, a second cross-sectional view 200B of the sub-mount 100 of FIG. 1, in accordance with an embodiment of the present invention, is shown. The second cross-sectional view 200B illustrates the sub-mount 100 along BB' axis (as shown in FIG. 1).

Figure 2C:
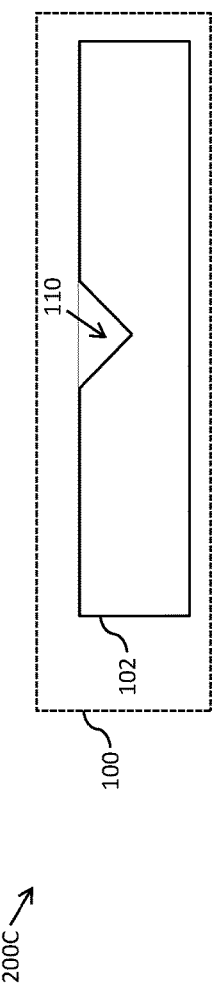
FIG. 2C is a third cross-sectional view of the sub-mount of FIG. 1, in accordance with an embodiment of the present invention.

Referring now to FIG. 2C, a third cross-sectional view 200C of the sub-mount 100 of FIG. 1, in accordance with an embodiment of the present invention, is shown. The third cross-sectional view 200C illustrates the sub-mount 100 along CC' axis (as shown in FIG. 1). The third cross-sectional view 200C further illustrates the v-groove 110 formed on the substrate 102.

Figure 3E:
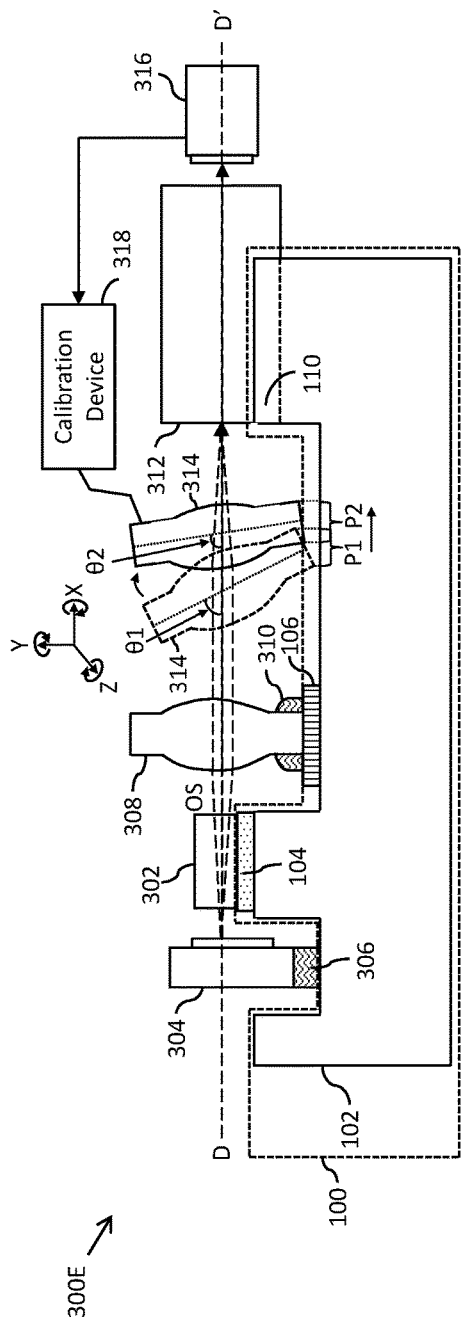

Referring now to FIGS. 3A-3F, cross-sectional views 300A-300F that illustrate the steps of an optoelectronic assembly manufacturing method, in accordance with an embodiment of the present invention, are shown. With reference to FIG. 3A, the cross-sectional view 300A illustrates an optical die 302 that is attached to the sub-mount 100.

The optical die 302 has a first edge 302A that serves as a die alignment feature for the optical die 302. In another embodiment, the optical die 302 may have a fiducial mark (not shown), such as a cross, that serves as the die alignment feature. Examples of the optical die 302 include, but are not limited to, a waveguide-based diode laser, a photo-detector, a planar lightwave circuit (PLC), and an optoelectronic chip. The optical die 302 is an edge-emitting single-mode circuitry that is formed by integrating various single-mode photonic devices, such as an optical coupler (not shown), an array waveguide grating (AWG) (not shown), and a mode-size-converter (not shown). The optical die 302 has an active region (not shown), such as an optical spot, for emitting an optical signal, OS. The optical die 302 emits the optical signal OS with an output mode-profile that is less than 2 µm in vertical direction and less than 3 µm in horizontal direction. Further, as the numerical aperture is inversely related to the mode-profile, the optical die 302 has a large numerical aperture, such as 0.5.

For attaching the optical die 302 to the sub-mount 100, the sub-mount 100 is loaded on a placement bench (not shown) of a placement tool (not shown). The placement tool picks up the optical die 302, and aligns the first edge 302A, i.e., the die alignment feature, of the optical die 302 with the first passive alignment feature 108A by using optical microscopy alignment method. In one example, the placement tool uses an optical microscope (not shown) to align the first edge 302A with the first passive alignment feature 108A, such that the first edge 302A overlaps the first passive alignment feature 108A. When accurate alignment between the first edge 302A and the first passive alignment feature 108A is attained, the placement tool places the optical die 302 on the first portion 104A (as shown in FIG. 1) of the metal layer 104. In one embodiment, the sub-mount 100 may include first and second physical mating features (not shown), such as stand-offs and stop-blocks, at the first portion 104A that further aid in the accurate alignment of the optical die 302 on the sub-mount 100. The sub-mount 100 is then reflowed for attaching the optical die 302 at the first portion 104A. The axis DD' represents an optical axis (i.e., a propagation axis of the optical signal OS) of the optical die 302.

With reference to FIG. 3B, the cross-sectional view 300B illustrates a monitoring photodetector 304 that is attached to the sub-mount 100. The monitoring photodetector 304 is attached to the substrate 102 that is exposed in the first depression 202 by way of a first epoxy layer 306. The monitoring photodetector 304 is adjacent to the optical die 302, and is aligned with the optical axis DD' of the optical die 302. The monitoring photodetector 304 monitors an intensity of the optical signal OS that is emitted by the optical die 302 for fault detection in the optical die 302.

With reference to FIG. 3C, the cross-sectional view 300C illustrates a first lens 308 that is attached to the sub-mount 100. Examples of the first lens 308 include, but are not limited to, a ball-shaped lens, a spherical lens, and an aspherical lens. The first lens 308 can be a machined lens or a molded lens that is enclosed in a box-shaped body. The first lens 308 has a second edge 308A that serves as a lens alignment feature for the first lens 308. In another embodiment, the first lens 308 has a fiducial mark (not shown), such as a cross, that serves as the lens alignment feature.

For attaching the first lens 308 to the sub-mount 100, the placement tool picks up the first lens 308, and aligns the second edge 308A, i.e., the lens alignment feature, of the first lens 308 with the second passive alignment feature 108B by using the optical microscopy alignment method. The placement tool may use the optical microscope to align the second edge 308A with the second passive alignment feature 108B, such that the second edge 308A overlaps the second passive alignment feature 108B. When accurate alignment between the second edge 308A and the second passive alignment feature 108B is attained, the placement tool places the first lens 308 on the dielectric layer 106. The first lens 308 is then attached to the dielectric layer 106 by way of a second epoxy layer 310. In one embodiment, the sub-mount 100 may include a third physical mating feature (not shown), such as a lens guiding hole, on the dielectric layer 106 that further aids in the accurate alignment of the first lens 308 on the sub-mount 100. Due to the alignment of the second edge 308A with the second passive alignment feature 108B, the first lens 308 is aligned with the optical die 302. Hence, the optical axis DD' of the optical die 302 coincides with an optical axis (not shown) of the first lens 308. The optical signal OS becomes incident upon the first lens 308. The first lens 308 then collimates the optical signal OS, thereby making the optical signal OS parallel to the surface of the substrate 102.

With reference to FIG. 3D, the cross-sectional view 300D illustrates an optical fiber 312 that is placed on the sub-mount 100. The optical fiber 312 has an input mode-profile having a first diameter, such as 9 µm, for receiving the optical signal OS. Based on the first diameter, the optical fiber 312 has a small numerical aperture, such as 0.1.

For placing the optical fiber 312 on the sub-mount 100, the placement tool picks up the optical fiber 312, and then places the optical fiber 312 in the v-groove 110. The v-groove 110 serves as the third passive alignment feature 110 and aids in the accurate placement of the optical fiber 312 on the sub-mount 100. Since the numerical aperture (for example, 0.1) of the optical fiber 312 is less than the numerical aperture (for example, 0.5) of the optical die 302, there is a mismatch in the numerical apertures of the optical die 302 and the optical fiber 312. For compensating the mismatch between the numerical apertures of the optical die 302 and the optical fiber 312, a second lens 314 (as shown in FIG. 3E) is actively aligned on the sub-mount 100.

With reference to FIG. 3E, the cross-sectional view 300E illustrates the active alignment of the second lens 314 on the sub-mount 100. The cross-sectional view 300E further illustrates a measuring device 316 and a calibration device 318 that perform the active alignment of the second lens 314.

The second lens 314 is a focusing lens that receives the optical signal OS collimated by the first lens 308 and focuses the optical signal OS on to the optical fiber 312. The second lens 314 is actively aligned between the first lens 308 and the optical fiber 312 for compensating the mismatch in the numerical apertures of the optical die 302 and the optical fiber 312, thereby achieving a high coupling efficiency. Examples of the second lens 314 include, but are not limited to, a ball-shaped lens, a spherical lens, and an aspherical lens. The second lens 314 can be a machined lens or a molded lens that is enclosed in a box-shaped body.

The measuring device 316 is a device that measures the optical power of the optical signal OS that is received by the optical fiber 312 through the first and second lenses 308 and 314. In one example, the measuring device 316 is an optical power meter. The measuring device 316 communicates the measured optical power to the calibration device 318.

The calibration device 318 is a device that monitors a coupling efficiency with which the optical signal OS is coupled into the optical fiber 312 through the first and second lenses 308 and 314. The calibration device 318 monitors the coupling efficiency based on the measured optical power received from the measuring device 316. The calibration device 318 may include an actuator (not shown) and a processor (not shown). The calibration device 318 further calibrates at least one of a degree of tilt and a position of the second lens 314, based on the monitored coupling efficiency. For calibrating the position of the second lens 314, the calibration device 318 device may move the second lens 314 along X-axis, Y-axis, Z-axis, or a combination thereof. For calibrating the degree of tilt of the second lens 314, the calibration device 318 may perform at least one of a yaw, pitch, and roll operations on the second lens 314 with respect to the propagation axis of the optical signal OS. Yaw refers to an angular rotation of the second lens 314 about Y-axis. Pitch refers to an angular rotation of the second lens 314 about Z-axis. Roll refers to an angular rotation of the second lens 314 about X-axis.

For performing the active alignment of the second lens 314, the calibration device 318 picks up the second lens 314 and places the second lens 314 at an initial position P1 on the sub-mount 100. The calibration device 318 may further introduce an initial degree of tilt, such as θ1, to the second lens 314. The initial position P1 is between the first lens 308 and the optical fiber 312. When the second lens 314 is placed between the first lens 308 and the optical fiber 312, the optical signal OS collimated by the first lens 308 becomes incident upon the second lens 314. The second lens 314 then focuses the optical signal OS on to the optical fiber 312. The optical fiber 312 receives the focused optical signal OS.

The measuring device 316 then measures the optical power of the optical signal OS that is received by the optical fiber 312, and communicates the measured optical power to the calibration device 318. The calibration device 318 monitors the coupling efficiency with which the optical signal OS is coupled into the optical fiber 312 through the first and second lenses 308 and 314, based on the measured optical power. The calibration device 318 further compares the monitored coupling efficiency with a coupling efficiency threshold. In one example, the coupling efficiency threshold is 50%. The coupling efficiency threshold may be predefined based on system requirements.

In a scenario, when the monitored coupling efficiency is less than the coupling efficiency threshold, the calibration device 318 calibrates the position and the degree of tilt of the second lens 314. In one embodiment, the calibration device 318 may only calibrate the degree of tilt of the second lens 314. In another embodiment, the calibration device 318 may only calibrate the position of the second lens 314. In yet another, embodiment, the calibration device 318 may calibrate both the position and the degree of tilt of the second lens 314. For example, as shown in FIG. 3E, the calibration device 318 moves the second lens 314 from the initial position P1 to a new position P2. The position P2 is between the first lens 308 and the optical fiber 312. The calibration device 318 further performs an angular rotation on the second lens 314 to introduce a new degree of tilt θ2. Based on the calibration of the position and the degree of tilt of the second lens 314, the optical power of the optical signal OS received by the optical fiber 312 changes.

The measuring device 316 then measures the new optical power of the optical signal OS and communicates the measured optical power to the calibration device 318. The calibration device 318 further monitors the coupling efficiency based on the new optical power measured by the measuring device 316. In one scenario, the calibration device 318 may determine that the coupling efficiency has not exceeded the coupling efficiency threshold, when the second lens 314 having the degree of tilt θ2 was placed at the position P2. In such a scenario, the calibration device 318 repeats the calibration of the position and degree of tilt of the second lens 314. The calibration device 318 may repeat the calibration until the coupling efficiency exceeds the coupling efficiency threshold. In an alternate scenario, the calibration device 318 may determine that the coupling efficiency has exceeded the coupling efficiency threshold, when the second lens 314 having the degree of tilt θ2 was placed at the position P2. In such a scenario, the calibration device 318 may identify the position P2 as a final position for the second lens 314 and the degree of tilt θ2 as a final degree of tilt. Active alignment of the second lens 314 as explained in the foregoing is the process of calibrating the position and degree of tilt of the second lens 314 by monitoring the coupling efficiency. The calibration device 318 may then place the second lens 314 having the degree of tilt θ2 at the position P2.

Figure 3F:
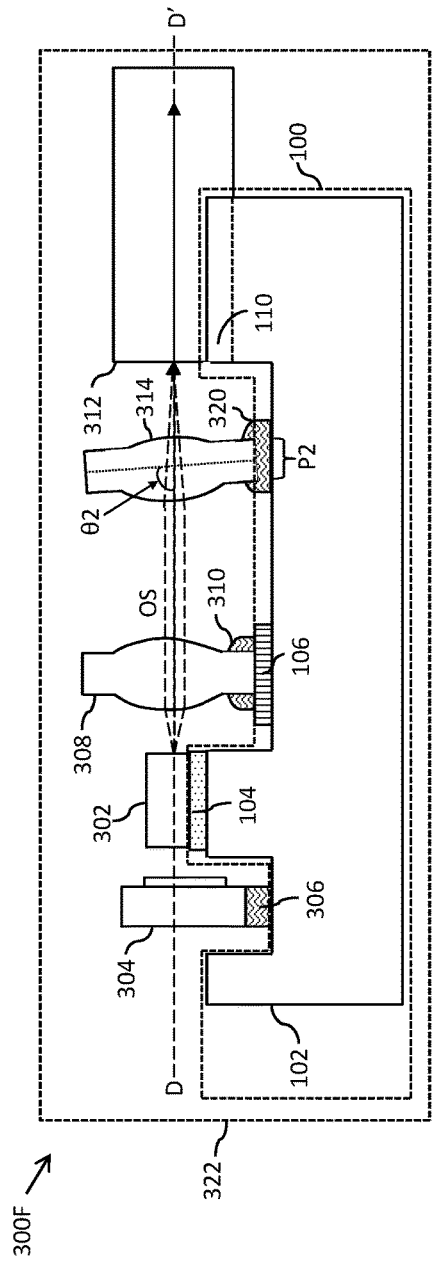

With reference to FIG. 3F, the cross-sectional view 300F illustrates the second lens 314 attached to the sub-mount 100. The second lens 314 having the final degree of tilt, such as the degree of tilt θ2, is attached to the sub-mount 100 at the final position, such as the position P2. The second lens 314 is attached to the sub-mount 100 by way of a third epoxy layer 320. The sub-mount 100 having the optical die 302, the monitoring photodetector 304, the first lens 308, the second lens 314, and the optical fiber 312 attached thereon forms an optoelectronic assembly 322.

In the optoelectronic assembly 322, the first and second lenses 308 and 314 couple the optical OS emitted by the optical die 302 into the optical fiber 312 with a coupling efficiency that exceeds the coupling efficiency threshold, for example 50%. The optical fiber 312 may then communicate the optical signal OS to one or more remote devices. In an embodiment, the optoelectronic assembly 322 may further include a thermistor 402 (as shown in FIG. 4).

In another embodiment, the monitoring photodetector 304, the first lens 308, and the second lens 314 may be attached to the sub-mount 100 by way of welding or adhesive layers (not shown). The optoelectronic assembly 322 may further include an isolator (not shown) that is attached between the first lens 308 and the second lens 314 without departing from the spirit of the invention. The isolator may be attached by way of a fourth passive alignment feature (not shown) of the sub-mount 100. The isolator prevents the propagation of the optical signal OS in a pre-determined direction. For example, the isolator ensures that the optical signal OS is transmitted from the first lens 308 to the second lens 314, and prevents the propagation of the optical signal OS from the second lens 314 to the first lens 308 due to back-reflection.

Figure 4:
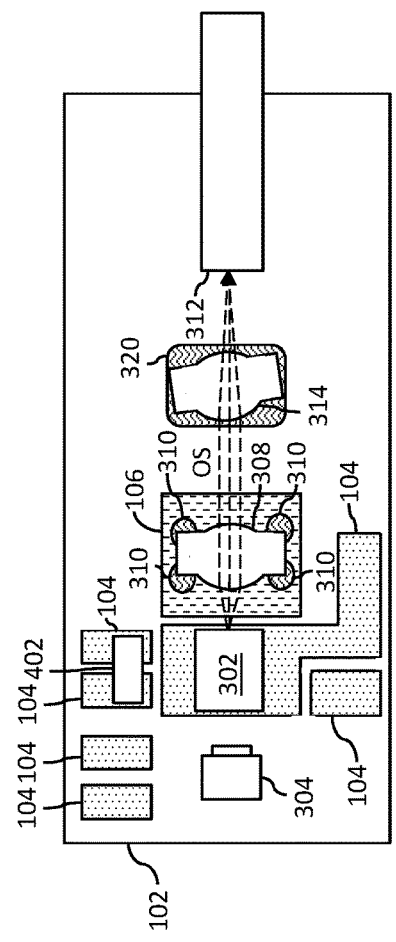
FIG. 4 is top view of the optoelectronic assembly of FIG. 3F, in accordance with an embodiment of the present invention.

Referring now to FIG. 4, a top view of the optoelectronic assembly 322 of FIG. 3F, in accordance with an embodiment of the present invention, is shown. The optoelectronic assembly 322 further includes the thermistor 402. The thermistor 402 is attached to the sub-mount 100 by way of the metal layer 104. The thermistor 402 stabilizes a temperature of the optical die 302.

The sub-mount 100 has the first through third passive alignment features 108A, 108B, and 110 that are formed based on optical alignment requirements. Further, the optical die 302, the first lens 308, and the optical fiber 312 are passively aligned on the sub-mount 100 by way of the first through third passive alignment features 108A, 108B, and 110. Hence, the optoelectronic assembly 322 does not require high precision alignment for attaching the optical die 302, the first lens 308, and the optical fiber 312. The optoelectronic assembly 322 uses an active alignment process for aligning the second lens 314, thereby compensating for any alignment error that may have occurred during the attachment of the optical die 302, the first lens 308, and the optical fiber 312 on the sub-mount 100. Thus, the optoelectronic assembly 322 ensures high coupling efficiency, i.e., greater than 50%. Since the optoelectronic assembly 322 requires a single active alignment process for coupling the optical signal OS emitted by the optical die 302 to the optical fiber 312, the time required for manufacturing the optoelectronic assembly 322 is significantly less than the manufacturing time of the prior art solutions that required two active alignment processes. Further, the optoelectronic assembly 322 is implemented on a single substrate, i.e., the substrate 102, which is a silicon optical bench, and therefore is less bulky as compared to the conventional optoelectronic assemblies implemented by using two different sub-mounts.

Figure 5A:
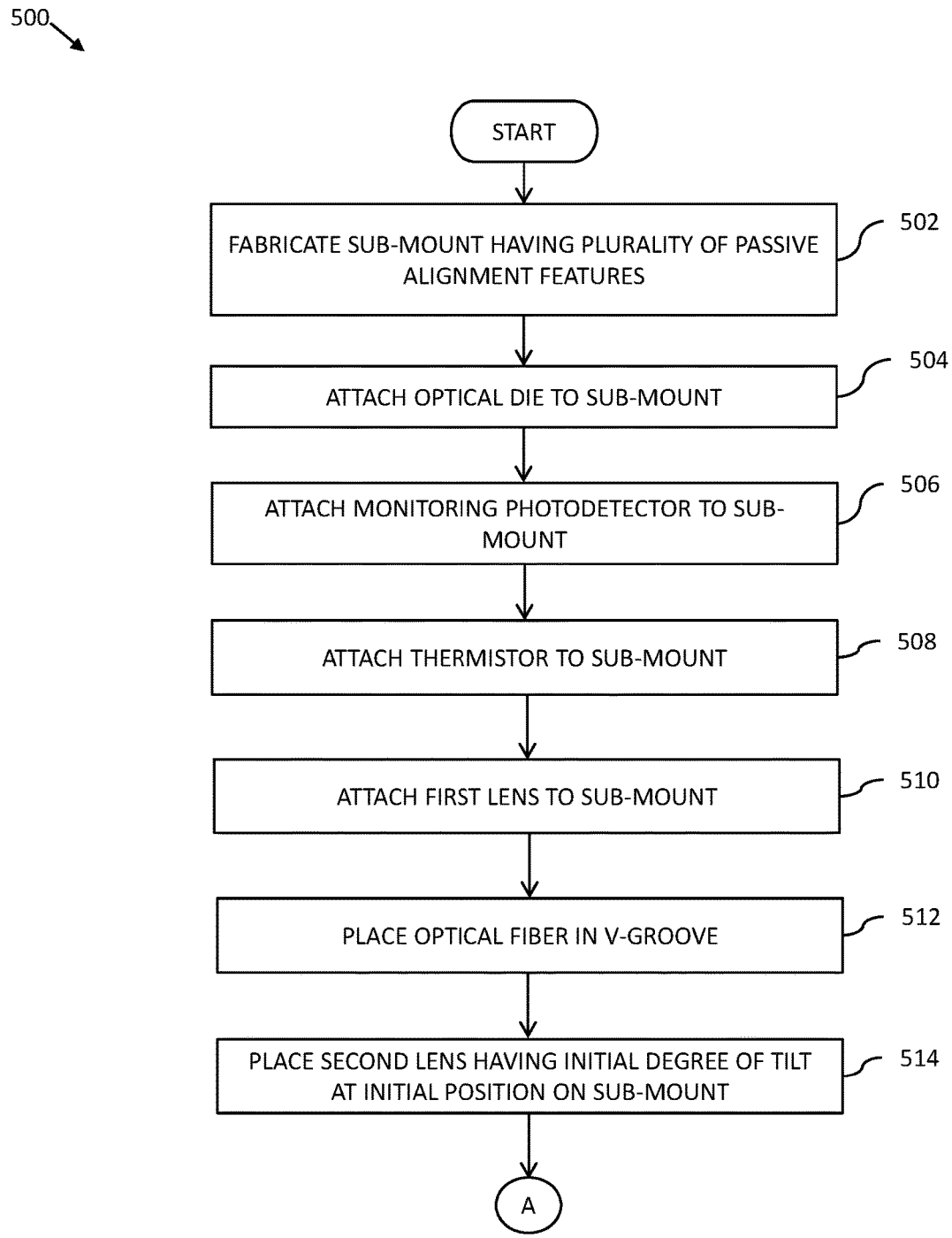
FIGS. 5A, 5B, and 5C collectively represent a flow chart that illustrates a method for manufacturing the optoelectronic assembly of FIG. 3F and FIG. 4, in accordance with an embodiment of the present invention.
Figure 5B:
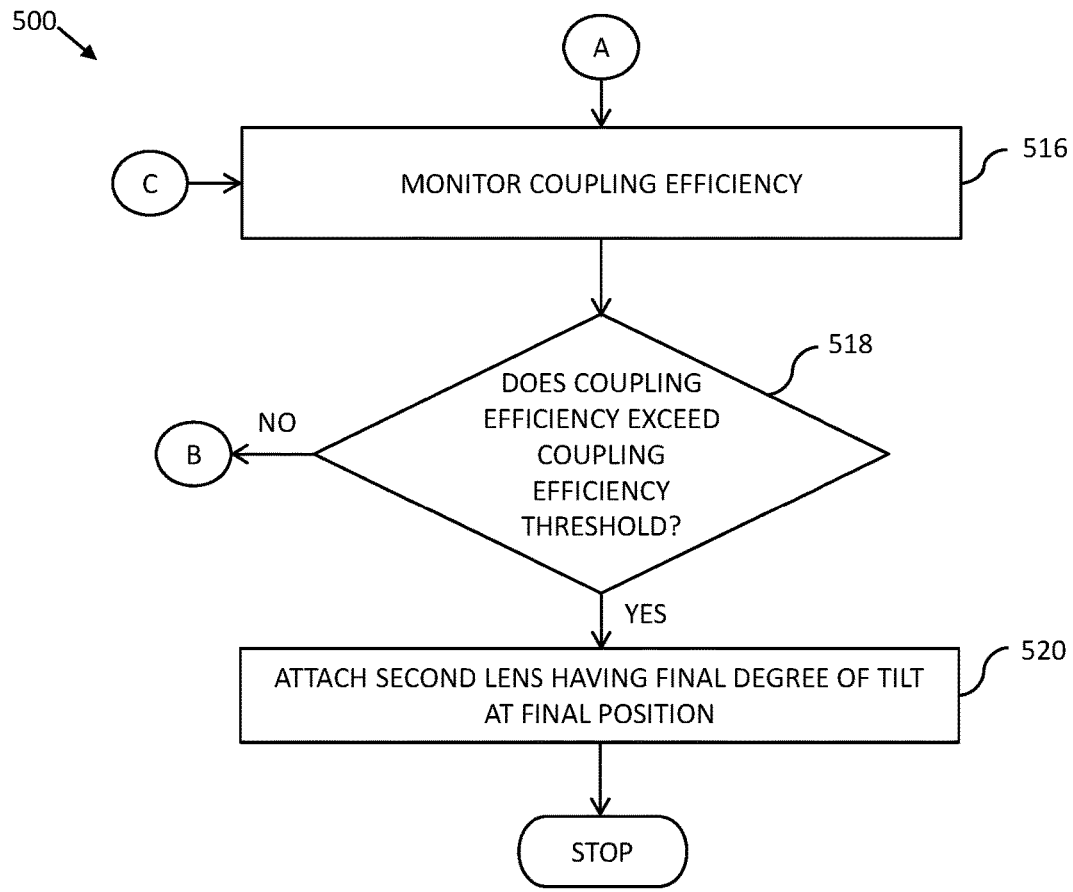
Figure 5C:
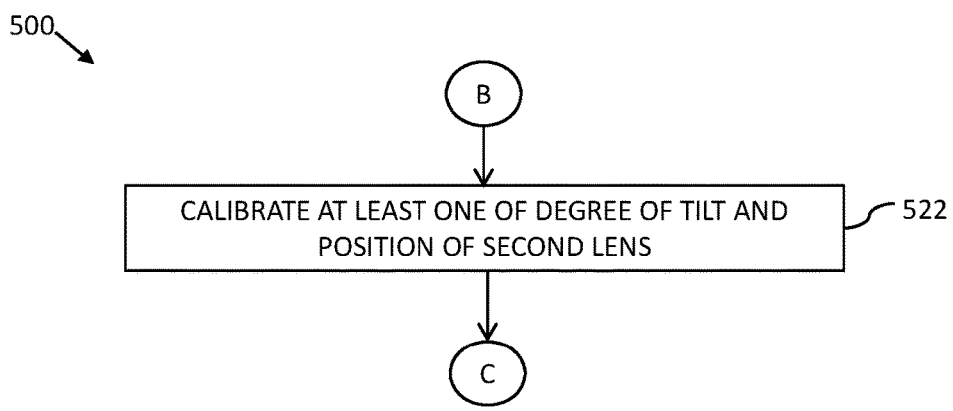

Referring now to FIGS. 5A, 5B, and 5C, a flow chart 500 that illustrates a method for manufacturing the optoelectronic assembly 322 of FIG. 3F and FIG. 4, in accordance with an embodiment of the present invention, is shown.

At step 502, the sub-mount 100 having a plurality of passive alignment features, such as the first through third passive alignment features 108A, 108B, and 110, is fabricated as explained in FIG. 1 and FIG. 2A-2C. At step 504, the optical die 302 is attached to the sub-mount 100 by aligning the first edge 302A, i.e., the die alignment feature, with the first passive alignment feature 108A.

At step 506, the monitoring photodetector 304 is attached to the sub-mount 100 for monitoring the intensity of the optical signal OS emitted by the optical die 302. At step 508, the thermistor 402 is attached to the sub-mount 100 for stabilizing the temperature of the optical die 302. At step 510, the first lens 308 is attached to the sub-mount 100 by aligning the second edge 308A, i.e., the lens alignment feature, with the second passive alignment feature 108B. The alignment between the second edge 308A and the second passive alignment feature 108B automatically aligns the first lens 308 with the optical die 302. The first lens 308 collimates the optical signal OS.

At step 512, the optical fiber 312 is placed in the v-groove 110, i.e., the third passive alignment feature 110. At step 514, the second lens 314 having the initial degree of tilt θ1 is placed at the initial position P1 on the sub-mount 100. The initial position P1 is between the first lens 308 and the optical fiber 312. The second lens 314 focuses the optical signal OS on to the optical fiber 312.

At step 516, the calibration device 318, in conjunction with the measuring device 316, monitors the coupling efficiency with which the optical signal OS is coupled into the optical fiber 312. At step 518, the calibration device 318 determines whether the coupling efficiency exceeds the coupling efficiency threshold. If at step 518, it is determined that the coupling efficiency exceeds the coupling efficiency threshold, step 520 is performed. At step 520, the second lens 314 having a final degree of tilt, such as the degree of tilt θ2, is attached to the sub-mount 100 at the final position, such as the position P2, thereby resulting in the formation of the optoelectronic assembly 322.

If at step 518, it is determined that the coupling efficiency does not exceed the coupling efficiency threshold, step 522 is performed. At step 522, the calibration device 318 calibrates at least one of the degree of tilt and the position of the second lens 314, and then performs the step 516.

As the alignment of the optical die 302, the first lens 308, and the optical fiber 312 on the sub-mount 100 is based on the first through third passive alignment features 108A, 108B, and 110, the optoelectronic assembly 322 does not require high precision alignment. Further, by implementing a single active alignment process for the second lens 314, the optoelectronic assembly 322 ensures high coupling efficiency, i.e., greater than 50%, with significant reduction in the time required for manufacturing the optoelectronic assembly 322.

Techniques consistent with the present invention provide, among other features, methods for manufacturing an optoelectronic assembly for optical coupling. While various exemplary embodiments of the disclosed system and method have been described above it should be understood that they have been presented for purposes of example only, not limitations. It is not exhaustive and does not limit the invention to the precise form disclosed.

In the claims, the words 'comprising', 'including' and 'having' do not exclude the presence of other elements or steps then those listed in a claim. The terms "a" or "an," as used herein, are defined as one or more than one. Unless stated otherwise, terms such as "first" and "second" are used to arbitrarily distinguish between the elements such terms describe. Thus, these terms are not necessarily intended to indicate temporal or other prioritization of such elements. The fact that certain measures are recited in mutually different claims does not indicate that a combination of these measures cannot be used to advantage.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

What is claimed is:

1. An optoelectronic assembly, comprising:
    a sub-mount having a plurality of passive alignment features;
    an optical die that has a die alignment feature, and is attached to the sub-mount by aligning the die alignment feature with a first passive alignment feature of the plurality of passive alignment features, wherein the optical die emits an optical signal;
    a first lens that has a lens alignment feature, and is attached to the sub-mount by aligning the lens alignment feature with a second passive alignment feature of the plurality of passive alignment features, wherein the aligning of the lens alignment feature with the second passive alignment feature aligns the first lens with the optical die;
    an optical fiber that is placed on the sub-mount by way of a third passive alignment feature of the plurality of passive alignment features, and receives the optical signal through the first lens; and
    a second lens that has a first degree of tilt with respect to a propagation axis of the optical signal, and is attached to the sub-mount at a first position between the first lens and the optical fiber, wherein the first degree of tilt and the first position are determined by monitoring a coupling efficiency with which the optical signal is coupled into the optical fiber through the first and second lenses.

2. The optoelectronic assembly of claim 1, wherein the coupling efficiency is monitored by calibrating a position of the second lens on the sub-mount, and wherein the first position is determined, when the coupling efficiency exceeds a coupling efficiency threshold.

3. The optoelectronic assembly of claim 1, wherein the coupling efficiency is monitored by calibrating a degree of tilt of the second lens with respect to the propagation axis of the optical signal, and wherein the first degree of tilt is determined, when the coupling efficiency exceeds a coupling efficiency threshold.

4. The optoelectronic assembly of claim 3, wherein the degree of tilt of the second lens is calibrated by performing at least one of yaw, pitch, and roll of the second lens with respect to the propagation axis of the optical signal.

5. The optoelectronic assembly of claim 1, further comprising:
    a monitoring photodetector that is attached to the sub-mount, and is adjacent to the optical die, wherein the monitoring photodetector monitors an intensity of the optical signal.

6. The optoelectronic assembly of claim 1, further comprising:
    a thermistor that is attached to the sub-mount for stabilizing a temperature of the optical die.

7. The optoelectronic assembly of claim 1, wherein the third passive alignment feature is a v-groove formed on the sub-mount, and wherein the optical fiber is placed in the v-groove.

8. The optoelectronic assembly of claim 1, wherein the first lens collimates the optical signal, and wherein the second lens receives the optical signal that is collimated by the first lens and focuses the optical signal on to the optical fiber.

9. A method for manufacturing an optoelectronic assembly, the method comprising:
    attaching an optical die having a die alignment feature to a sub-mount having a plurality of passive alignment features, wherein the optical die is attached to the sub-mount by aligning the die alignment feature with a first passive alignment feature of the plurality of passive alignment features, and wherein the optical die emits an optical signal;
    attaching a first lens having a lens alignment feature to the sub-mount by aligning the lens alignment feature with a second passive alignment feature of the plurality of passive alignment features, wherein the aligning of the lens alignment feature with the second passive alignment feature aligns the first lens with the optical die;
    placing an optical fiber on the sub-mount by way of a third passive alignment feature of the plurality of passive alignment features, wherein the optical fiber receives the optical signal through the first lens;
    determining a first degree of tilt for a second lens with respect to a propagation axis of the optical signal, and a first position between the first lens and the optical fiber for attaching the second lens on the sub-mount, based on a coupling efficiency with which the optical signal is coupled into the optical fiber through the first and second lenses; and
    attaching the second lens, having the first degree of tilt, to the sub-mount at the first position.

10. The method of claim 9, further comprising monitoring the coupling efficiency by calibrating a position of the second lens on the sub-mount, wherein the first position is determined, when the coupling efficiency exceeds a coupling efficiency threshold.

11. The method of claim 9, further comprising monitoring the coupling efficiency by calibrating a degree of tilt of the second lens with respect to the propagation axis of the optical signal, wherein the first degree of tilt is determined, when the coupling efficiency exceeds a coupling efficiency threshold.

12. The method of claim 11, wherein the degree of tilt of the second lens is calibrated by performing at least one of yaw, pitch, and roll of the second lens with respect to the propagation axis of the optical signal.

13. The method of claim 9, further comprising attaching a monitoring photodetector to the sub-mount for monitoring an intensity of the optical signal, wherein the monitoring photodetector is adjacent to the optical die.

14. The method of claim 9, further comprising attaching a thermistor to the sub-mount for stabilizing a temperature of the optical die.

15. The method of claim 9, wherein the third passive alignment feature is a v-groove formed on the sub-mount, and wherein the optical fiber is placed in the v-groove.

16. The method of claim 9, wherein the first lens collimates the optical signal, and wherein the second lens receives the optical signal that is collimated by the first lens and focusses the optical signal on to the optical fiber.

17. An optoelectronic assembly manufactured by a process comprising the steps of:
  attaching an optical die having a die alignment feature to a sub-mount having a plurality of passive alignment features, wherein the optical die is attached to the sub-mount by aligning the die alignment feature with a first passive alignment feature of the plurality of passive alignment features, and wherein the optical die emits an optical signal;
  attaching a first lens having a lens alignment feature to the sub-mount by aligning the lens alignment feature with a second passive alignment feature of the plurality of passive alignment features, wherein the aligning of the lens alignment feature with the second passive alignment feature aligns the first lens with the optical die;
  placing an optical fiber on the sub-mount by way of a third passive alignment feature of the plurality of passive alignment features, wherein the optical fiber receives the optical signal through the first lens;
  determining a first degree of tilt for a second lens with respect to a propagation axis of the optical signal, and a first position between the first lens and the optical fiber for attaching the second lens on the sub-mount, based on a coupling efficiency with which the optical signal is coupled into the optical fiber through the first and second lenses; and
  attaching the second lens, having the first degree of tilt, to the sub-mount at the first position.

18. The optoelectronic assembly manufactured by the process of claim 17, further comprising the step of:
  monitoring the coupling efficiency by calibrating a position of the second lens on the sub-mount, wherein the first position is determined, when the coupling efficiency exceeds a coupling efficiency threshold.

19. The optoelectronic assembly manufactured by the process of claim 17, further comprising the step of:
  monitoring the coupling efficiency by calibrating a degree of tilt of the second lens with respect to the propagation axis of the optical signal, wherein the first degree of tilt is determined, when the coupling efficiency exceeds a coupling efficiency threshold.

20. The optoelectronic assembly manufactured by the process of claim 17, further comprising the steps of:
  attaching a monitoring photodetector to the sub-mount for monitoring an intensity of the optical signal, wherein the monitoring photodetector is adjacent to the optical die; and
  attaching a thermistor to the sub-mount for stabilizing a temperature of the optical die.

* * * * *